United States Patent [19]

Arlasky et al.

[11] Patent Number: 4,595,903

[45] Date of Patent: Jun. 17, 1986

[54] TAMPER RESISTANT AUTOMOTIVE ANTI-THEFT DEVICE

[76] Inventors: David F. Arlasky; Ronald F. Arlasky, both of 3241 River Falls Dr., Northbrook, Ill. 60062; Allan B. Crites, 1050 Carswell Ave., Elk Grove Village, Ill. 60007; Carol Miller, 2331 N. Kedzie, Chicago, Ill. 60647; Anthony J. Pellicano, 775 Whalcom La., Schaumburg, Ill. 60193; Frank W. Weinberger, 1225 N. Stratford Rd., Arlington Heights, Ill. 60004

[21] Appl. No.: 718,839

[22] Filed: Apr. 4, 1985

Related U.S. Application Data

[63] Continuation of Ser. No. 399,740, Jul. 19, 1982, abandoned.

[51] Int. Cl.[4] .............. E05B 63/00; B60R 25/04
[52] U.S. Cl. ........................... 340/64; 70/1.5; 70/241; 200/61.6 T; 307/10 AT; 340/63; 180/289
[58] Field of Search ............ 70/1.5, 240, 241, 256; 340/63, 64; 307/10 AT; 200/43.11, 61.67; 180/289, 287

[56] References Cited

U.S. PATENT DOCUMENTS

| | | |
|---|---|---|
| 1,463,218 | 7/1923 | Lauritzen et al. |
| 1,481,498 | 1/1924 | Boggess . |
| 1,519,904 | 12/1924 | Cummings . |
| 1,846,782 | 2/1932 | Ballamos . |
| 1,974,489 | 9/1934 | Geraghty . |
| 1,997,050 | 4/1935 | Donovan . |
| 2,385,285 | 9/1945 | Kolias . |
| 3,226,506 | 12/1965 | Angrisani .................. 335/205 |
| 3,538,725 | 11/1970 | Guenther et al. .......... 70/241 |
| 3,597,949 | 8/1971 | Nigrelli ...................... 70/1.5 |
| 3,634,724 | 1/1972 | Vest ....................... 307/10 AT |
| 3,651,329 | 3/1972 | Marlowe et al. ........ 307/10 AT |
| 3,731,963 | 5/1973 | Pond ......................... 70/241 |
| 3,744,285 | 7/1973 | Barmherzig ................ 70/241 |
| 3,760,617 | 9/1973 | Westerdale ................. 70/1.5 |
| 3,820,361 | 6/1974 | Leither ................... 307/10 AT |
| 3,831,406 | 8/1974 | Gebhard et al. ............. 70/1.5 |
| 4,083,211 | 4/1978 | Scherbing ................... 70/363 |
| 4,102,164 | 7/1978 | Barbush ..................... 70/241 |
| 4,211,995 | 7/1980 | Smith ........................ 340/63 |

Primary Examiner—John W. Caldwell, Sr.
Assistant Examiner—Brent A. Swarthout
Attorney, Agent, or Firm—Marshall, O'Toole, Gerstein, Murray & Bicknell

[57] ABSTRACT

Tamper-resistant features are provided for a vehicle hood-locking and ignition disabling apparatus which functions as an automotive anti-theft device. These tamper resistant features are responsive to efforts to defeat or by-pass the anti-theft device and comprise: 1. a magnetically-operated alarm; 2. a lock "breakaway" portion responsive to efforts to break or pull the lock portion of anti-theft device; and 3. an underhood dead latch assembly adapted to dead-bolt the hood of the vehicle in a closed position, and to latch the ignition-disabling circuitry in a closed position.

2 Claims, 11 Drawing Figures

FIG. 5
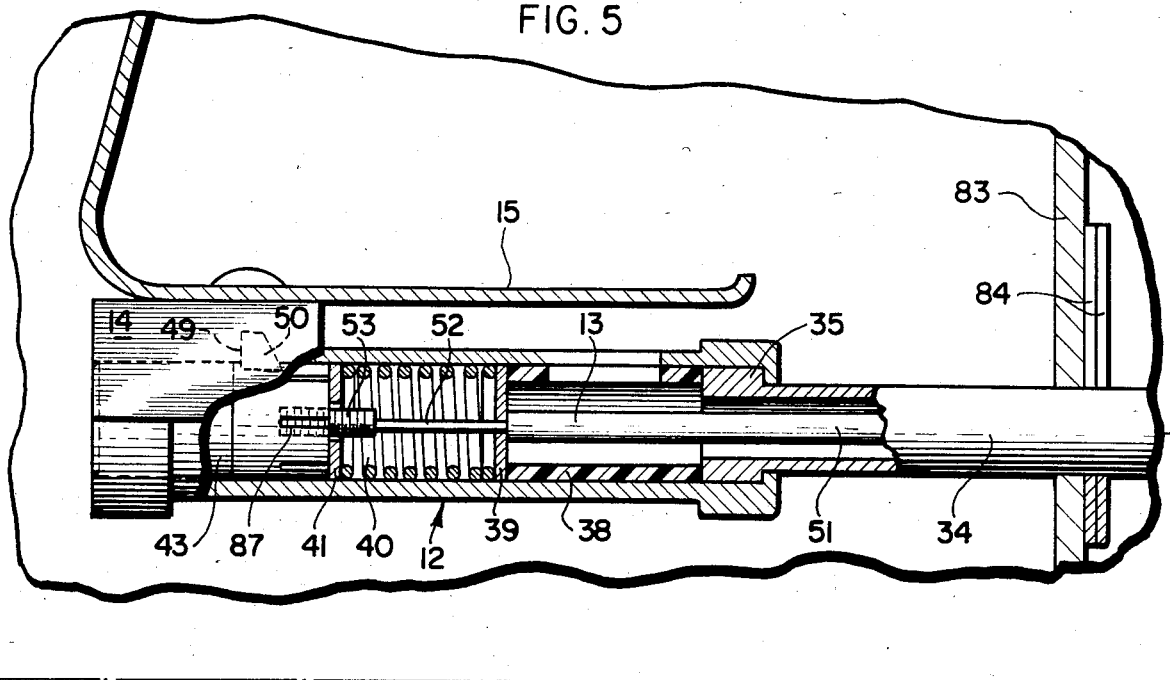
FIG. 6
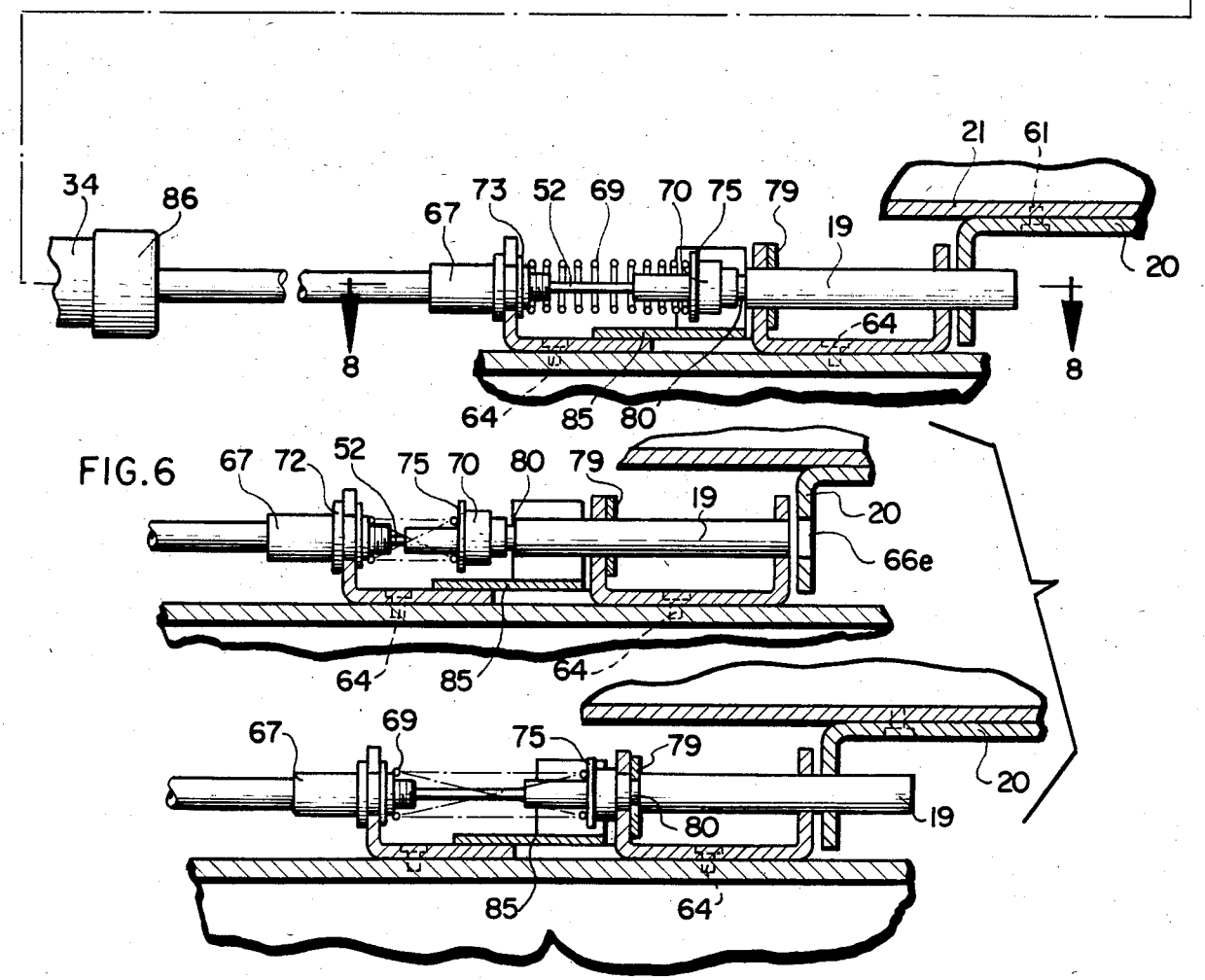
FIG. 7

TAMPER RESISTANT AUTOMOTIVE ANTI-THEFT DEVICE

This application is a continuation of application Ser. No. 399,740, filed July 19, 1982, and now abandoned.

BACKGROUND OF THE INVENTION

The present invention relates generally to a anti-theft device for a motor vehicle, and more particularly to tamper-resistant theft prevention apparatus which both renders the ignition system of a vehicle inoperative and prevents access to the vehicle's engine compartment.

The apparatus of the present invention is similar to the locking device of U.S. Pat. No. 3,538,725 which discloses a remotely-controlled locking apparatus adapted both to secure the hood of a motor vehicle and to activate an ignition-disabling electrical switch. When engaged, the locking device prevents access to the "under hood" area of the motor vehicle by means of slide bolt in contact with a keeper. The slide bolt and keeper are located under the vehicle's hood, but controlled from the vehicle passenger compartment by means of a control cable which is connected at its under-hood end to the slide bolt, and at its other end to a retractable lock. The retractable lock is fitted in a steel casing mounted on or adjacent to the dashboard of the automobile. The anti-theft apparatus is activated by depressing the retractable lock to a closed (locked) position. Depressing the lock also serves to close an electrical switch which activates the circuitry which renders the vehicle's ignition system inoperative.

Although the locking device of the U.S. Pat. No. 3,538,725 has proven to be an effective deterrant, nonetheless that device can be defeated where there exists an opportunity to tamper with the locking apparatus over a period of time, e.g., when a motor vehicle is left in an isolated area. Forcing or bypassing the retractable lock provides not only access to the reciprocating control cable and thereby the "under hood" area of the motor vehicle, but also to the ignition-disabling switch portion of the anti-theft device. If this switch is opened, the motor vehicle engine can be started with conventional ignition bypassing techniques ("hot-wiring").

SUMMARY OF THE INVENTION

The present invention provides an improved anti-theft device for a motor vehicle which incorporates features adapted to respond to and to defeat efforts to tamper with the combination hood locking/ignition disabling apparatus. The anti-theft apparatus of the present invention is designed to be easily engaged and disengaged by use of the proper key. Attempts to force the system's retractable lock or to otherwise tamper with the lock mechanism, however, will activate "fail-safe" devices associated with the anti-theft apparatus.

The tamper-responsive elements of the present apparatus include an alarm-triggering, magnetically-operable switch, a retractable lock having a break-away portion, and a secondary hood-locking mechanism—all responsive to efforts to tamper with the anti-theft apparatus. The magnetically-operable switch or reed switch, normally in an open position, is in proximity to a permanent magnet. A removable metallic shield isolates the reed switch from the effects of the magnetic field. An attempt to defeat the anti-theft apparatus by removing the apparatus from its under-dash mounting, however, will displace the shield, causing the reed switch to close a circuit which is electrically connected to an alarm, an automobile horn, or other signalling device.

The retractable lock of the anti-theft apparatus is equiped with a lock tail portion which cooperates with and anchors the reciprocating cable controlling the underhood slide bolt. This lock tail portion is adapted to break in response to unusual stresses or shocks such as those engendered by attempts to force the lock. Breaking the lock tail portion serves to uncouple the reciprocating lock/control cable interconnection, preventing disengagement of the under-hood bolt.

The anti-theft device is provided with a secondary hood-locking mechanism associated with the underhood slide bolt assembly. This secondary locking mechanism comprises a deadlatch assembly responsive to either severing the reciprocating control cable or breaking the lock/control cable interconnection. Although the control cable and slide bolt are normally under spring tension, the fact that the cable is anchored to the reciprocating lock overcomes these spring forces. Severing the cable from the anchor, however, causes the slide bolt to move forward in response to the spring's pressure into engagement with the deadlatch assembly. Once this deadlatch has become set, pulling on the free end of the control cable will no longer serve to disengage the slide bolt from the keeper. The deadlatch also serves to lock the ignition disabling electrical switch in a closed position.

Additional tamper-resistance has been provided by locating the ignition disabling circuitry in that portion of the lock which is under-hood, rather than in the under-dash area of the vehicle. Thus a thief cannot deactivate the ignition-disabling circuit by merely severing an under-dash wire.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify the like elements in several figures and in which:

FIG. 5 is a fragmentary sectional view of the installed theft prevention apparatus, taken in part on line 5—5 of FIG. 1, showing the apparatus in the normal locked position;

FIG. 6 is an elevational view, partly in section, of the underhood slide bolt and keeper portion of the apparatus, showing the apparatus in the unlocked position and with the foreward spring removed;

FIG. 7 is an elevational view, partly in section, of the underhood slide bolt and keeper portion of the anti-theft apparatus with the secondary locking mechanism in a dead-latched condition;

FIG. 10 is an elevational view, partly in section, showing the reciprocating lock portion of the anti-theft apparatus; and FIG. 11 is a fragmentary sectional view taken along line 8—8 of FIG. 3, with the elements of the apparatus in their normal, non-exploded, positions.

DETAILED DESCRIPTION OF THE DRAWINGS

Figure 1:
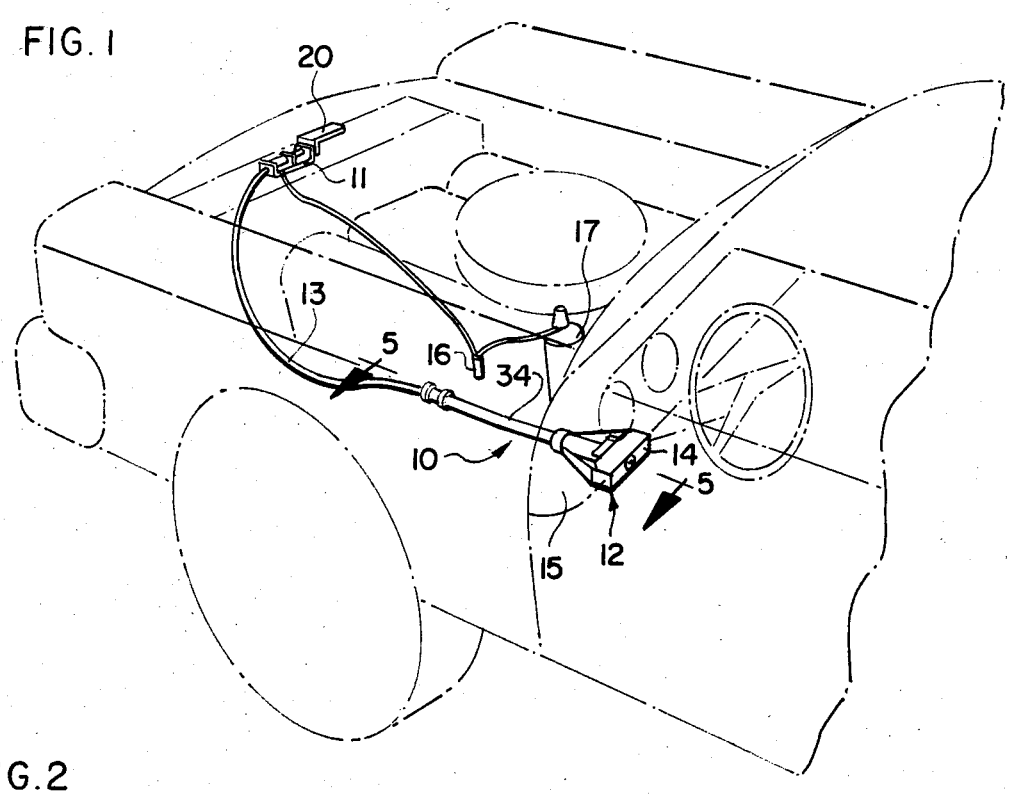
FIG. 1 is a pictorial representation illustrating the theft prevention apparatus of the present invention installed in a motor vehicle.

Referring now to FIG. 1, the theft prevention apparatus 10 of the present invention is shown installed in an automobile. Theft prevention apparatus 10 is an elongated device comprising a cable assembly 13 which terminates on one end at an underhood slide bolt bracket assembly 11, and on the other end at an underdash control head portion 12. Bracket assembly 11 contains both a slide bolt 19 adapted to engage a keeper 20 mounted to the inside of hood 21 (See FIG. 6), and an underhood leaf spring switch 18, responsive to the movement of bolt 19 (See FIG. 8). An ignition suppressor assembly 16 is electrically connected between a vehicle ignition coil 17 and switch 18.

Figure 2:
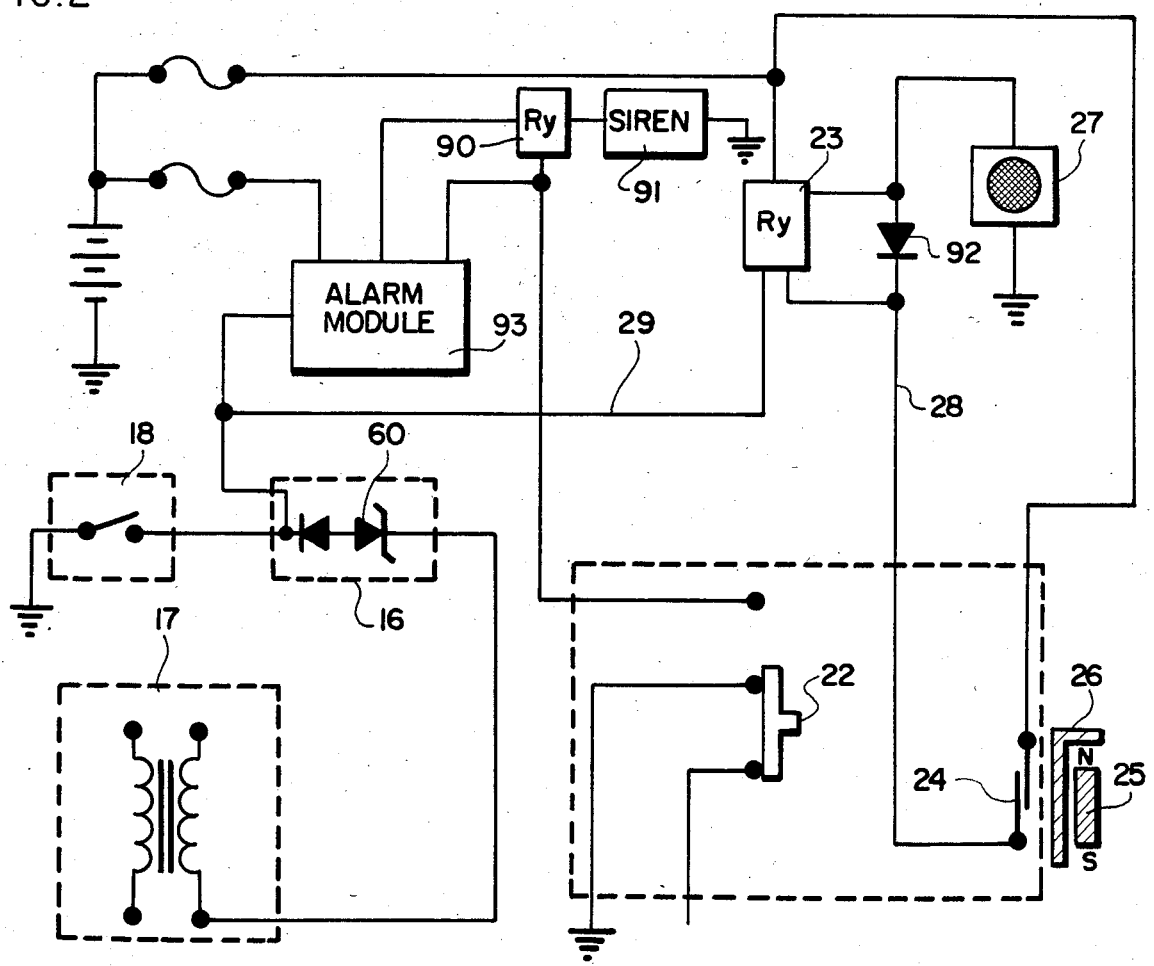
FIG. 2 is a schematic diagram, partially in block form, illustrating an electrical circuit embodying the present invention.

FIG. 2 depicts the electrical ignition-disabling and alarm activating circuitry of the theft prevention apparatus. When switch 18 is in the closed position, the primary of ignition coil 17 will be shunted to ground if the breakdown voltage of a Zener diode 60 in ignition supressor 16 is exceeded. Zener diode 60 is selected to have a breakdown voltage in the range 16 to 40 volts, preferably 25 to 30 volts. In a quiescent condition, the circuit will appear electrically open, notwithstanding the fact that switch 18 is engaged, because the battery voltage across diode 60 is less than the breakdown voltage. Any attempt to start the automobile, however, will cause a large voltage to start to develop on the primary of coil 17. If switch 18 is closed Zener diode 60 will break down and conduct when the voltage on the primary exceeds the Zener breakdown voltage. This breakdown prevents sufficient voltage to be built up on coil 17 to start the automobile's engine.

Although a conventional spark-activated engine is illustrated in the drawings, apparatus 10 can be used with a diesel engine by replacing ignition suppresser assembly 16 with a relay or a similar circuit interrupting device in the auto's starter or battery circuits.

Figure 3:
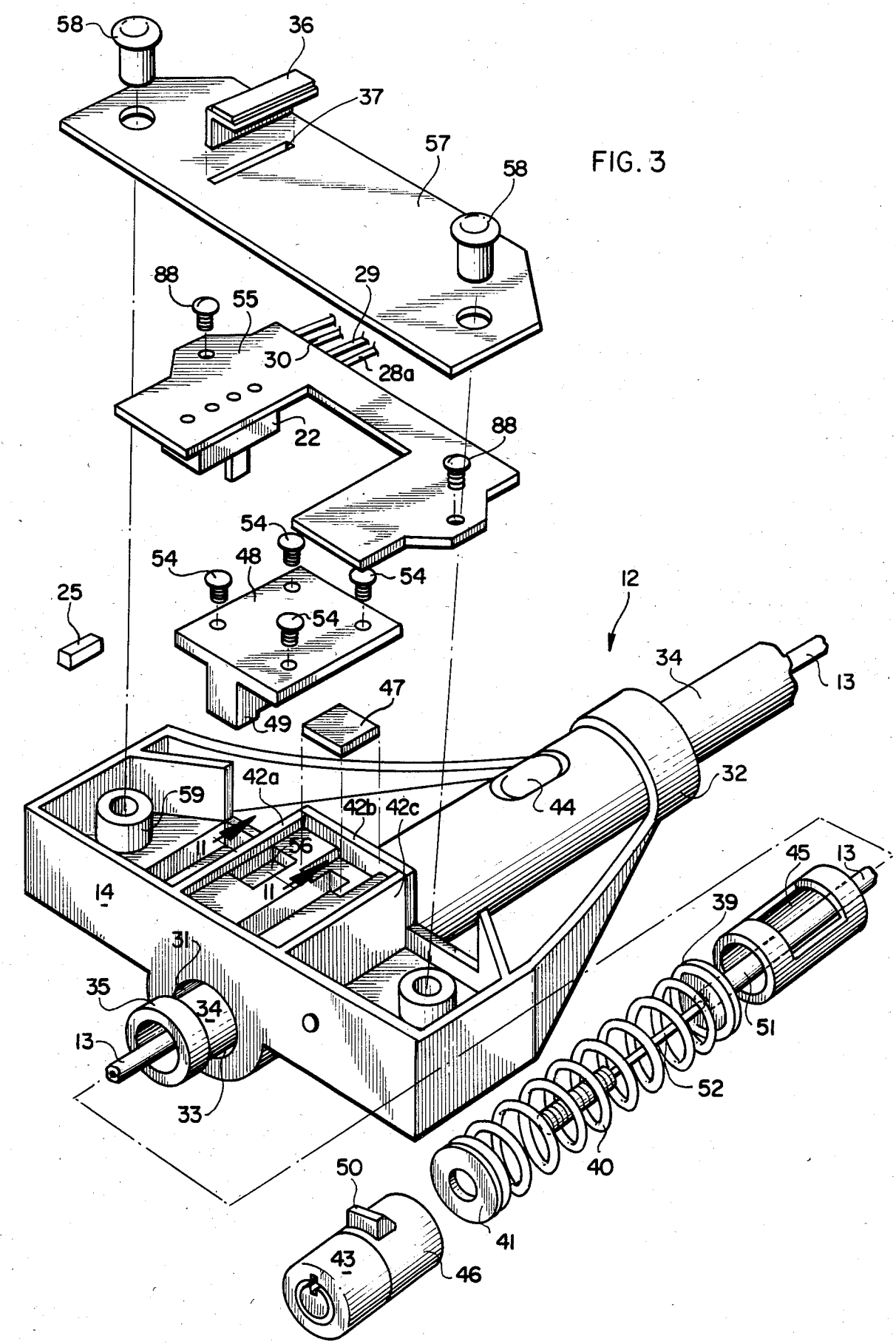
FIG. 3 is an exploded perspective view of the under-dashboard portion of the apparatus.

The alarm triggering circuitry includes a reed switch 24, a magnet 25, and a magnetic shield 26. As shown in FIGS. 3 and 11, a magnetic shield 26 is fixed to the underside of dash 15 by means of an adhesive 36 when theft prevention-apparatus 10 is installed in the automobile. Reed switch 24 is mounted on a circuit board 55 adjacent to magnet 25. Shield 26 fits into a slot 37 on control head 12 and insulates reed switch 24 from the effects of magnet 25. Because shield 26 is attached to dash 15 rather than to control head 12, removal of anti-theft apparatus 10 from its underdash mounting dislodges shield 26 from slot 37, exposing reed switch 24 to the field of magnet 25, causing reed switch 24 to close.

The electrical effects of activating reed switch 24 are shown in FIG. 2. Reed switch 24 serves as a trigger for an alarm, such as automobile horn 27. When switch 24 is closed, an alarm activating relay 23 is connected to chasis ground via reed switch lead 28 and ground lead 29, causing relay 23 to be energized. Energizing relay 23 causes horn 27 to sound, signalling that theft prevention-apparatus 10 has been tampered with. A latching diode 92 functions to lock relay 23 in a closed position whereby horn 27 will continue to sound even if reed switch 24 is restored to an open position. In other words, once reed switch 24 is closed, reopening that switch by interposing a magnetic shield between magnet 25 and switch 24 will not serve to quiet horn 27. Once activated, horn 27 will continue to sound as long as underhood switch 18 remains closed.

A slide switch 22 is also shown mounted on underdash control head assembly 12 (FIG. 3). When closed, slide switch 22 will activate a siren-actuating relay 90 and a siren 91. Slide switch 22 therefore serves as a driver-actuated "panic switch" in case of a perceived emergency situation.

An alarm module 93 can be interconnected with motion detectors and sensing devices (not shown) for activating siren-actuating relay 90 through switch 18 in response to attempts to enter either the automobile passenger compartment or the trunk, or to tow the automobile while switch 18 is closed.

FIG. 3 is an exploded view showing lock casing 14 and various subassemblies which cooperate to form underdash control head 12. A longitudinal passage 31 in casing 14 defines a cylindrical lock chamber 33 on the casing front portion and also permits insertion of a protective tube 34, and a spacer 38 within passage 31. Tube 34 extends rearwardly from lock casing 14, surrounding cable assembly 13 and providing a conduit for electrical wires connected to alarm circuitry on circuit board 55. Protective tube 34 has a tube flange portion 35 adapted to cooperate with a collar 32 of casing 14, thereby retaining one end of tube 34 within casing 14. (See FIG. 5)

Lock casing 14 has an arcuate slot 44 which registers with an opening 45 on spacer 38 to provide a wire passageway into tube 34. Walls 42a, 42b, 42c of casing 14 mate with a security plate 47 and a lock cap 48 to define a box-like enclosure for a tail-portion 46 of retractable lock 43. Security plate 47 is fabricated of hardened steel and provides additional protection against efforts to attack the lock with a drill. Lock cap 48 has a raised portion 49 which cooperates with spring bolt 50 of retractable lock 43 when theft prevention apparatus 10 is in the locked position. Compartment 56 of casing 14 retains magnet 25 adjacent reed 24 (FIG. 11).

Cable assembly 13 comprises an outer sheath 51 and an inner cable 52 longitudinally moveable within sheath 51. Tail portion 46 of lock 43 is internally threaded, defining a cable retaining portion 87 and inner cable 52 is connected thereto by means of a threaded post 53 (See FIG. 10). Front washer 41, large spring 40, and clamp washer 39 cooperate with spacer 38 and tail portion 46 to urge retractable lock 43 to an open position.

Lock cap 48 is mounted to lock casing 14 by means of hardened drive screws 54. Circuit board 55, to which is mounted slide switch 22 and reed switch 24 (FIG. 11), is retained on casing 14 by screws 88. A cover plate 57 is attached to casing 14 by eyelets 58 through bosses 59, defining passageways for screws (not shown) for mounting underdash control head assembly 12 to dash 15.

Figure 4:
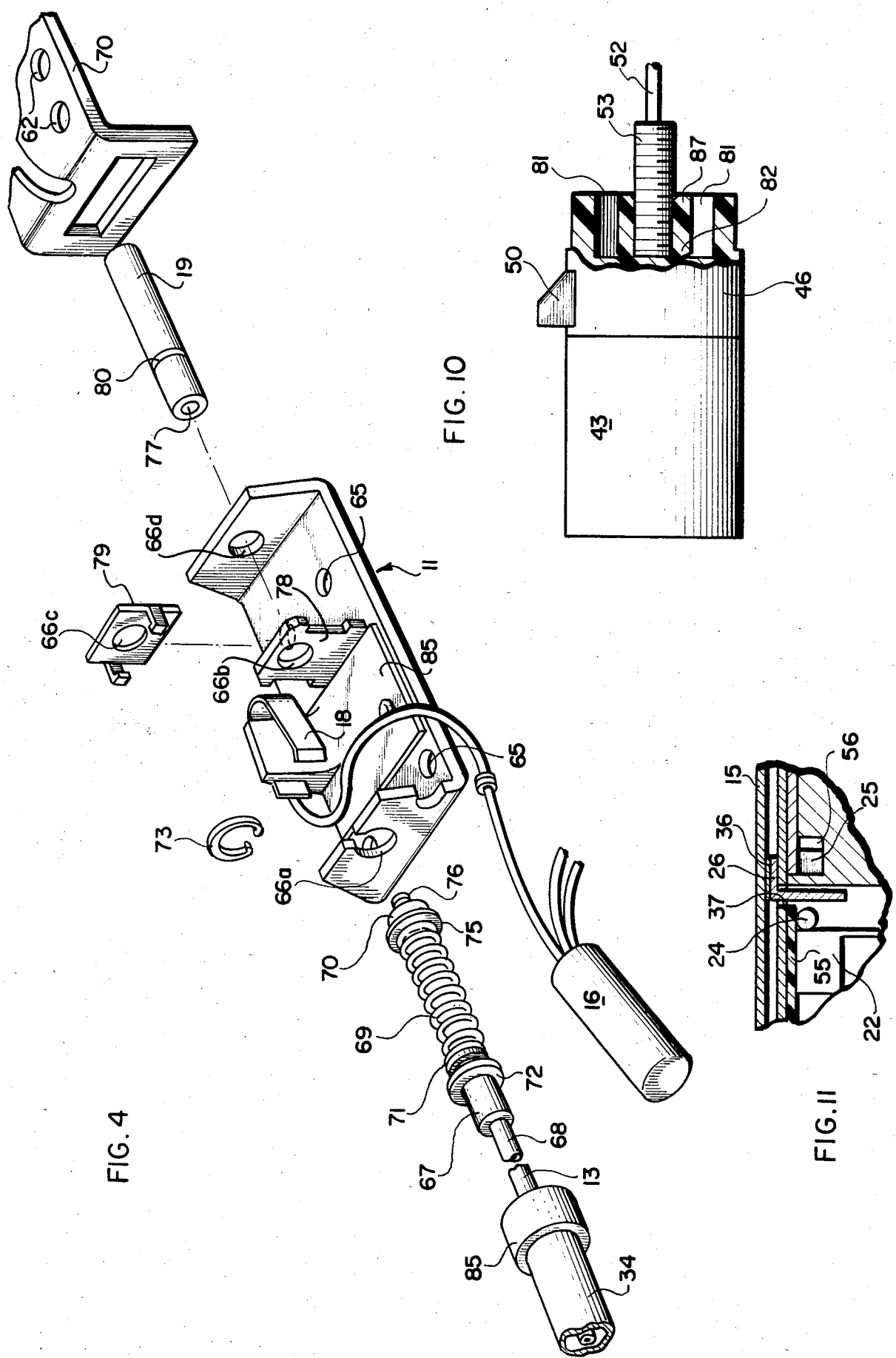
FIG. 4 is an exploded perspective view of the under-hood portion of the apparatus.

FIG. 4 is an exploded view of slide bolt assembly 11 and keeper 20. Keeper 20 is attached to hood 22 by means of hood fasteners 61 through keeper holes 62 in the manner shown in FIGS. 5 and 6 (i.e., rotated from its FIG. 4 position). Slide bolt assembly 11, to which is mounted slide bolt 19 and leaf spring switch 18, is attached to automobile frame 63 by means of bolt assembly screws 64 through bolt assembly holes 65. Bolt assembly 11 and keeper 20 are mounted so that bolt guide openings 66a, b, c, d are aligned when hood 21 is closed.

Ferrule 67 fits over underhood end 68 of cable assembly 13 and has both an upstanding front ridge 71 adapted to fit through bolt guide opening 66a, and a back ridge 72 larger than the diameter of opening 66a. A C clamp 73 fits on ferrule 67, between ridge 71 and ridge 72, anchoring cable assembly 13 to slide bolt assembly 11.

A bolt-engaging end of inner cable 52 extends out of ferrule 67 (FIG. 6), through a foreward biasing means, spring 69, where it is anchored to a contact nut 70. Contact nut 70 has a flanged portion 75 greater than the diameter of bolt guide opening 66b, and a threaded portion 76 adapted to interconnect with interior thread portion 77 of slide bolt 19. A slide bolt deadlatch 79 fits over bolt guide 78 to provide a deadlatch assembly when groove 80 of bolt 19 is advanced through guide opening 66b, under deadlatch 79. Groove 80 is wide enough to retain deadlatch 79 and cooperates with bolt guide 78 to prevent withdrawal of bolt 19 from keeper 20.

Figure 8:
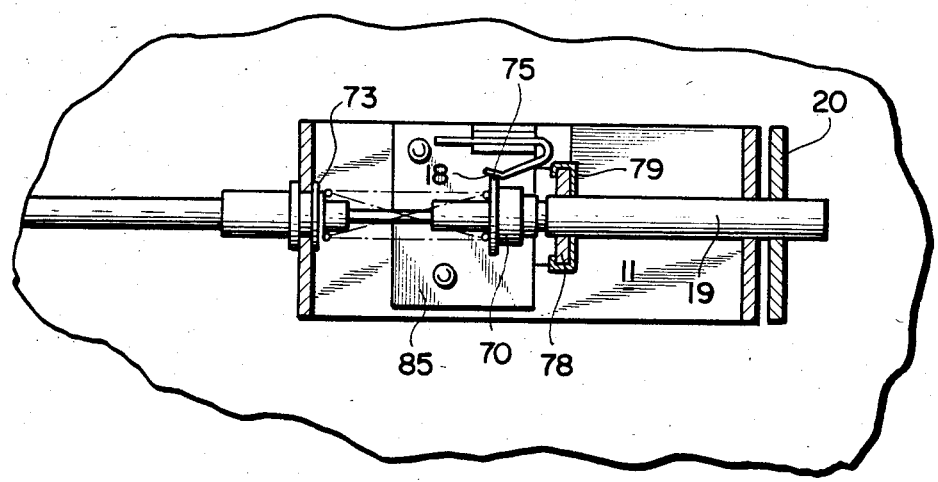
FIG. 8 is a sectional view, taken along line 8—8 of FIG. 5, showing a plan view of the underhood slide bolt and keeper in the normal locked position.
Figure 9:
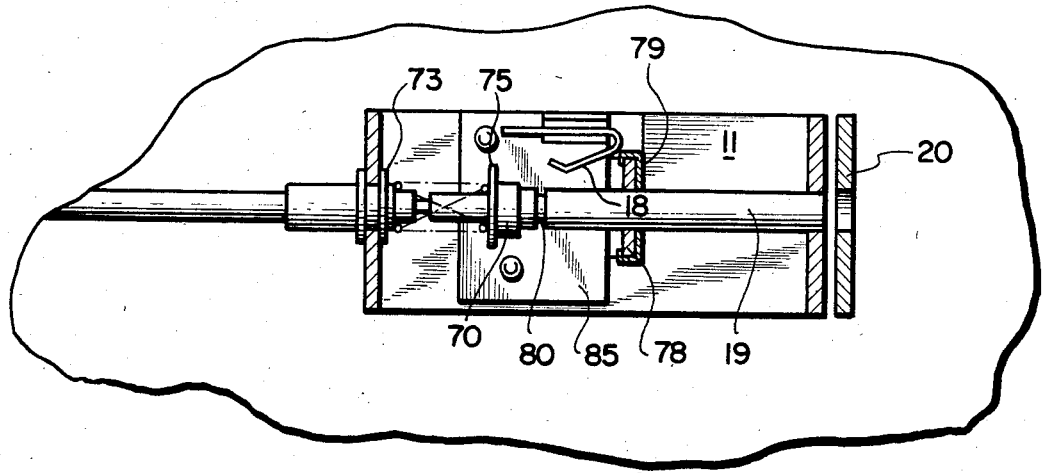
FIG. 9 is a plan view of the underhood slide bolt and keeper, with the apparatus in the unlocked position.

Referring to FIGS. 8 and 9, leaf spring switch 18 is mounted on a phenolic insulator 85 which in turn is attached to slide bolt bracket assembly 11. Ignition supressor 16 is electrically connected to switch 18 (FIG. 4).

FIG. 5 shows portions of underhood slide bolt assembly 11 and underdash control head assembly 12 with the theft prevention apparatus in the locked position. Protective tube 34 extends through automobile firewall 83. Two notched retaining washers 84 fit around protective tube 34 and cooperate with a knob 86 on tube 34 to prevent the withdrawal of control head assembly 12 through firewall 83.

An unlocked slide bolt assembly 11 is depicted in FIG. 6 with compressed foreward spring 69 removed for greater clarity. Slide bolt 19, slideably mounted on bracket assembly 11, is not in locking relationship with keeper 20, and hood 21 may be opened in a conventional manner (FIG. 9).

Leaf spring 18 mounted on insulator 85 is electrically isolated from contact nut 70 and chassis ground in the unlocked position of FIG. 6 and FIG. 9. In the closed (FIG. 5 and FIG. 8) position, however, flange portion 75 of contact nut 70 is in contact with leaf spring switch 18 and thus switch 18 is at ground potential. The electrical effect of closing switch 18 has been previously explained and can be readily understood by examining the circuit of FIG. 2.

FIG. 10 shows retractable lock 43 engaged with threaded post 53. In applicants' preferred embodiment, tail portion 46 of lock 43 is manufactured by an injection molding process, using an organic thermoplastic or thermosetting material. A particularly useful material for this application is fibreglass reinforced nylon. A circumferential chamfer 81 in lock tail portion 46 defines a weakened area 82 which will break in response to attempts to pull or force the lock.

The operation of the deadlatch assembly can be understood by examining FIGS. 5, 6 and 7. FIG. 5 shows the theft prevention apparatus in its locked position. Retractable lock 43 is held in a forward position by means of the engagement of spring bolt 50 with raised portion 49. Inner cable 52 has been moved foreward, through outer sheath 51 of cable assembly 13, causing slide bolt 19 to move from its FIG. 6 position and pass into bolt guide opening 66e of keeper 20. Foreward spring 69 is in tension and exerts a force against contact nut 70 and slide bolt 19 in the direction of keeper 20. Inner cable 52, anchored at one end to contact nut 70 and at the other end to to retractable lock 43, counterbalances the effects of spring 69 and serves to retain bolt 19 in its FIG. 5 condition, rather than the deadlatched position of FIG. 7.

Should inner cable 52 be severed, however, slide bolt 19 will move foreward in response to spring 69, permitting deadlatch 79 to fall into groove 80 (FIG. 7). A similar effect will result if threaded post 53 is torn from its anchor with tail portion 46 of lock 43 as a result of efforts to tamper with lock casing 14. In that event, threaded post 53 and inner cable 52 will be moved further within longitudinal passage 31 of lock casing 14 thereby making it more difficult to reach a free end of cable 52. Even if a free end of cable 52 should be reached, deadlatch 79 cooperates with groove 80 to fasten slide bolt 19 into engagement with keeper 20, preventing its withdrawal by pulling on cable 52.

What is claimed:

1. In a vehicle anti-theft device having an underhood bolt and keeper, a control head assembly mounted in the vehicle passenger compartment for moving said bolt into engagement with said keeper, a retractable lock on said control head assembly, said lock having a cable retaining lock tail portion, and a reciprocating control cable interconnecting said underhood bolt and said reciprocating lock, the improvement comprising:
   underhood bracket means mounted on said vehicle for guiding said underhood bolt;
   forward biasing means on said underhood bracket means operatively connected with said reciprocating control cable for urging said underhood bolt toward said underhood keeper;
   a slide bolt deadlatch mounted on said bracket means and in contact with said bolt;
   a groove on said bolt for receiving said slide bolt deadlatch and holding said bolt in a fastened condition whereby said bolt engages said keeper;
   said deadlatch being responsive to separation of said control cable from said cable retaining tail portion.

2. Apparatus according to claim 1, wherein said vehicle utilizes an ignition coil for voltage generation, further including:
   underhood switch means adjacent said underhood bolt;
   ignition suppressor means electrically connected between said underhood switch means and said ignition coil;
   said underhood switch means responsive to the movement of said bolt into engagement with said keeper whereby said ignition suppressor is switched to an operating condition.

* * * * *